United States Patent
Navrátil et al.

(10) Patent No.: US 11,502,778 B2
(45) Date of Patent: Nov. 15, 2022

(54) METHOD AND APPARATUS FOR EFFICIENT DELIVERY OF SOURCE AND FORWARD ERROR CORRECTION STREAMS IN SYSTEMS SUPPORTING MIXED UNICAST MULTICAST TRANSMISSION

(71) Applicant: Nokia Technologies Oy, Espoo (FI)

(72) Inventors: David Navrátil, Helsinki (FI); Athul Prasad, Naperville, IL (US); Mikko Säily, Laukkoski (FI); Andreas Maeder, Würzburg (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/292,589

(22) PCT Filed: Nov. 12, 2018

(86) PCT No.: PCT/US2018/060568
§ 371 (c)(1),
(2) Date: May 10, 2021

(87) PCT Pub. No.: WO2020/101639
PCT Pub. Date: May 22, 2020

(65) Prior Publication Data
US 2022/0006563 A1 Jan. 6, 2022

(51) Int. Cl.
*H04L 1/00* (2006.01)
*H04L 1/18* (2006.01)
*H04L 47/10* (2022.01)

(52) U.S. Cl.
CPC .......... *H04L 1/0041* (2013.01); *H04L 1/1867* (2013.01); *H04L 47/15* (2013.01)

(58) Field of Classification Search
CPC ... H04L 1/0041; H04L 1/1812; H04L 1/1822; H04L 1/1845; H04L 1/1867; H04L 45/15
See application file for complete search history.

(56) References Cited

U.S. PATENT DOCUMENTS

| 7,899,046 B2 | 3/2011 | Ver Steeg |
| 8,867,539 B2 | 10/2014 | Glasser et al. |

(Continued)

FOREIGN PATENT DOCUMENTS

| WO | 2019/042560 A1 | 3/2019 |
| WO | 2019/114939 A1 | 6/2019 |
| WO | 2020/035795 A1 | 2/2020 |

OTHER PUBLICATIONS

"3rd Generation Partnership Project;Technical Specification Group Services and System Aspects;Multimedia Broadcast/Multicast Service (MBMS);Protocols and codecs (Release 15)", 3GPP TS 26.346, V15.2.0, Sep. 2018, pp. 1-282.

(Continued)

*Primary Examiner* — Shelly A Chase
(74) *Attorney, Agent, or Firm* — Nokia Technologies Oy (57) ABSTRACT

A method, apparatus and computer program product receive an application flow comprising a source flow and a supplementary flow from a core network. The method, apparatus and computer program product receive a flow payload indication from the core network. The method, apparatus and computer program product determine whether the application flow is to be transmitted via a unicast transmission or a multicast transmission. The method, apparatus and computer program product determine whether the supplementary flow is droppable based on the flow payload indication and whether the application flow is to be transmitted via a unicast transmission or a multicast transmission. The method, apparatus and computer program product cause only the source flow to be transmitted in a circumstance where the supplementary flow is droppable.

20 Claims, 8 Drawing Sheets

(56) References Cited

U.S. PATENT DOCUMENTS

| | | | |
|---|---|---|---|
| 2007/0002858 A1 | 1/2007 | Bichot et al. | |
| 2010/0296427 A1* | 11/2010 | Lohr | H04L 1/1822 370/312 |
| 2012/0269110 A1 | 10/2012 | Walker et al. | |
| 2014/0348165 A1 | 11/2014 | Frydman et al. | |
| 2015/0257159 A1* | 9/2015 | Speicher | H04W 76/10 370/235 |
| 2015/0358374 A1 | 12/2015 | Wei et al. | |
| 2016/0044099 A1 | 2/2016 | Oyman | |
| 2016/0142886 A1 | 5/2016 | Kotecha et al. | |
| 2016/0360439 A1 | 12/2016 | Phan et al. | |
| 2016/0374050 A1 | 12/2016 | Prasad et al. | |
| 2017/0180077 A1 | 6/2017 | Kwak et al. | |
| 2017/0374581 A1 | 12/2017 | Dao | |
| 2018/0123810 A1 | 5/2018 | Luby et al. | |
| 2018/0192289 A1 | 7/2018 | Dao | |
| 2019/0028920 A1* | 1/2019 | Pan | H04L 47/24 |

OTHER PUBLICATIONS

Paila et al., "FLUTE—File Delivery over Unidirectional Transport", RFC 6726, Internet Engineering Task Force (IETF), Nov. 2012, pp. 1-46.

Luby et al., "Asynchronous Layered Coding (ALC) Protocol Instantiation", RFC 5775, Internet Engineering Task Force (IETF), Apr. 2010, pp. 1-24.

Watson et al., "Forward Error Correction (FEC) Framework", RFC 6363, Internet Engineering Task Force (IETF), Oct. 2011, pp. 1-42.

Rey et al., "RTP Retransmission Payload Format", RFC 4588, Network Working Group, Jul. 2006, pp. 1-35.

Majumsar et al., "Multicast and Unicast Real-time Video Streaming over Wireless LANs", IEEE Transactions on Circuits and Systems for Video Technology, vol. 12, No. 6, Jun. 2002, pp. 524-534.

"3rd Generation Partnership Project; Technical Specification Group Core Network and Terminals;5G System; Policy Authorization Service; Stage 3(Release 15)", 3GPP TS 29.514, V15.1.0, Sep. 2018, pp. 1-81.

"3rd Generation Partnership Project;Technical Specification Group Core Network and Terminals;5G System; Session Management Policy Control Service;Stage 3 (Release 15)", 3GPP TS 29.512, V15.1.0, Sep. 2018, pp. 1-112.

"3rd Generation Partnership Project;Technical Specification Group Services and System Aspects;Procedures for the 5G System; Stage 2(Release 15)", 3GPP TS 23.502, V15.3.0, Sep. 2018, pp. 1-330.

"3rd Generation Partnership Project;Technical Specification Group Core Network and Terminals;5G System; Access and Mobility Management Services; Stage 3 (Release 15)", 3GPP TS 29.518, V15.1.0, Sep. 2018, pp. 1-173.

"3rd Generation Partnership Project;Technical Specification Group Radio Access Network;NG-RAN; NG Application Protocol (NGAP)(Release 15)", 3GPP TS 38.413, V15.1.0, Sep. 2018, pp. 1-295.

"New SID on NR Mixed Mode Broadcast/multicast", 3GPP TSG RAN Meeting 80, RP-180669, Agenda : 10.1.1, Qualcomm Incorporated, Jun. 11-15, 2018, 3 pages.

Begen, "Session Description Protocol Elements for theForward Error Correction (FEC) Framework", RFC 6364, Internet Engineering Task Force (IETF), Oct. 2011, pp. 1-18.

"3rd Generation Partnership Project;Technical Specification Group Core Network and Terminals; Technical realization of Cell Broadcast Service (CBS)(Release 15)", 3GPP TS 23.041, V153.0, Sep. 2018, pp. 1-96.

International Search Report and Written Opinion received for corresponding Patent Cooperation Treaty Application No. PCT/US2018/060568, dated Jul. 24, 2019, 16 pages.

Baik et al., "Cross-layer Coordination for Efficient Contents Delivery in LTE eMBMS Traffic", IEEE 9th International Conference on Mobile Ad-Hoc and Sensor Systems (MASS 2012), Oct. 8-11, 2012, pp. 398-406.

Wang et al. "Efficient Streaming Delivery in eMBMS with HARQ and Raptor", IEEE International Conference on Communications (ICC), Jun. 5-9, 2011, 5 pages.

* cited by examiner

METHOD AND APPARATUS FOR EFFICIENT DELIVERY OF SOURCE AND FORWARD ERROR CORRECTION STREAMS IN SYSTEMS SUPPORTING MIXED UNICAST MULTICAST TRANSMISSION

RELATED APPLICATION

This application claims priority to PCT Application No. PCT/US2018/060568, filed on Nov. 12, 2018, which is incorporated herein by reference in its entirety.

TECHNICAL FIELD

An example embodiment relates generally to a method for operating a network entity for a cellular radio communications network and to a network entity for a cellular radio communications network.

BACKGROUND

In traditional wireless communication networks, if there is common content intended for mass delivery, the content can be delivered using multicast/broadcast since there are separate and dedicated user plane nodes and entities handling such traffic flows efficiently. The standardization efforts for fifth generation (5G) systems have already started as part of $3^{rd}$ Generation Partnership Project (3GPP) Release-14, with a diverse set of requirements ranging from very high data rates up to 20 Gigabits per second (Gbps) to ultra-reliable communications with air interface packet error probability down to $10^{\wedge}-5$ along with ultra-low-latency systems of 1 ms end-to-end latency. 5G systems may support multicast/broadcast and unicast.

In order to reach such a packet error probability, forward error correction (FEC) coding is used at various layers of the protocol stack in communication systems. 4G systems support Evolved Multimedia Broadcast Multicast Services (eMBMS) which supports multicast and broadcast along with unicast. eMBMS utilizes File Delivery over Unidirectional Transport (FLUTE) for various MBMS user services such as Progressive Download and Dynamic Adaptive Streaming over HyperText Transfer Protocol (HTTP) (3GP-DASH), file download according to 3GPP technical specification (TS) 26.346, or the like. FLUTE builds on top of asynchronous layer coding (ALC) which combines layered coding transport, congestion control and forward error correction (FEC) building blocks.

A general FEC framework supports applying FEC to arbitrary packet flows over unreliable transport and is primarily intended for real-time, or streaming, media data.

Some configurations of radio access networks (RAN) in 5G support autonomous determination to use unicast or multicast/broadcast transmission for an efficient transmission of multicast data over unicast radio bearers. A RAN may use different radio link control (RLC) entities for unicast and multicast/broadcast transmission and may use a switching function to select different RLC entities.

However, even though the RAN function may select whether to transmit multicast data using unicast or multicast/broadcast transmissions, the RAN may transmit the same data including FEC regardless of whether unicast or multicast/broadcast is selected. Unicast and multicast/broadcast transmissions may have different configurations and applying the same FEC may be inefficient. For example, for unicast transmission, hybrid automatic repeat request (HARQ) or radio link control (RLC) retransmission may be used. These lower layer retransmissions are often more efficient compared to using higher layer FEC, and require less bits to be transmitted over the air to achieve the same result. Therefore, applying higher layer FEC in this case would be redundant and inefficient.

BRIEF SUMMARY

A method, apparatus and computer program product are provided in accordance with an example embodiment to operate a network entity for a cellular radio communications network and to a network entity for a cellular radio communications network, in particular, to operate a RAN function in a 5G network that applies more efficient error correction mechanism such as forward error correction and/or retransmission based on whether unicast or multicast/broadcast transmission is utilized. For example, in some embodiments, a RAN function may not transmit higher layer FEC (application), if more efficient FEC is applied.

In one example embodiment, a method is provided that includes receiving an application flow comprising a source flow and a supplementary flow from a core network. The method further includes receiving a flow payload indication from the core network. The method further includes determining whether the application flow is to be transmitted via a unicast transmission or a multicast transmission. The method further includes determining whether the supplementary flow is droppable based on the flow payload indication and whether the application flow is to be transmitted via a unicast transmission or a multicast transmission. The method further includes in a circumstance where the supplementary flow is droppable, causing only the source flow to be transmitted.

In some implementations of such a method, the application flow is received from a user plane function (UPF) in the core network. In some embodiments, the supplementary flow is droppable if the supplementary flow is a forward error correction repair flow and if the application flow is to be transmitted via a unicast transmission. In some embodiments, the unicast transmission utilizes hybrid automatic repeat request (HARQ) retransmission or radio link control (RLC) retransmission. In some embodiments, the flow payload indication comprises one or more policy and charging control (PCC) rules provided by a policy control function.

In another example embodiment, an apparatus is provided that includes at least one processor and at least one memory including computer program code for one or more programs with the at least one memory and the computer program code configured to, with the at least one processor, cause the apparatus at least to receive an application flow comprising a source flow and a supplementary flow from a core network. The computer program code is further configured to, with the at least one processor, cause the apparatus to receive flow payload indication from the core network. The computer program code is further configured to, with the at least one processor, cause the apparatus to determine whether the application flow is to be transmitted via a unicast transmission or a multicast transmission. The computer program code is further configured to, with the at least one processor, cause the apparatus to determine whether the supplementary flow is droppable based on the flow payload indication and whether the application flow is to be transmitted via a unicast transmission or a multicast transmission. The computer program code is further configured to, with the at least one processor, cause the apparatus to transmit only the source flow in a circumstance where the supplementary flow is droppable.

In some implementations of such an apparatus, the application flow is received from a user plane function (UPF) in the core network. In some embodiments, the supplementary flow is droppable if the supplementary flow is a forward error correction repair flow and if the application flow is to be transmitted via a unicast transmission. In some embodiments, the unicast transmission utilizes hybrid automatic repeat request (HARQ) retransmission or radio link control (RLC) retransmission. In some embodiments, the flow payload indication comprises one or more policy and charging control (PCC) rules provided by a policy control function.

In another example embodiment, a computer program product is provided that includes at least one non-transitory computer-readable storage medium having computer executable program code instructions stored therein with the computer executable program code instructions comprising program code instructions configured, upon execution, to receive an application flow comprising a source flow and a supplementary flow from a core network. The computer executable program code instructions comprise program code instructions that are further configured, upon execution, to receive flow payload indication from the core network. The computer executable program code instructions comprise program code instructions that are further configured, upon execution, to determine whether the application flow is to be transmitted via a unicast transmission or a multicast transmission. The computer executable program code instructions comprise program code instructions that are further configured, upon execution, to determine whether the supplementary flow is droppable based on the flow payload indication and whether the application flow is to be transmitted via a unicast transmission or a multicast transmission. The computer executable program code instructions comprise program code instructions that are further configured, upon execution, to transmit only the source flow in a circumstance where the supplementary flow is droppable.

In some implementations of such a computer program product, the application flow is received from a user plane function (UPF) in the core network. In some embodiments, the supplementary flow is droppable if the supplementary flow is a forward error correction repair flow and if the application flow is to be transmitted via a unicast transmission. In some embodiments, the unicast transmission utilizes hybrid automatic repeat request (HARQ) retransmission or radio link control (RLC) retransmission. In some embodiments, the flow payload indication comprises one or more policy and charging control (PCC) rules provided by a policy control function.

In another example embodiment, an apparatus is provided that includes means for receiving an application flow comprising a source flow and a supplementary flow from a core network. The apparatus further includes means for receiving a flow payload indication from the core network. The apparatus further includes means for determining whether the application flow is to be transmitted via a unicast transmission or a multicast transmission. The apparatus further includes means for determining whether the supplementary flow is droppable based on the flow payload indication and whether the application flow is to be transmitted via a unicast transmission or a multicast transmission. The apparatus further includes means for transmitting only the source flow in a circumstance where the supplementary flow is droppable.

In some implementations of such an apparatus, the application flow is received from a user plane function (UPF) in the core network. In some embodiments, the supplementary flow is droppable if the supplementary flow is a forward error correction repair flow and if the application flow is to be transmitted via a unicast transmission. In some embodiments, the unicast transmission utilizes hybrid automatic repeat request (HARQ) retransmission or radio link control (RLC) retransmission. In some embodiments, the flow payload indication comprises one or more policy and charging control (PCC) rules provided by a policy control function.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

FIG. 7 is a flowchart illustrating a set of operations performed, such as by the apparatus of FIG. 1, in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment to operate a network entity for a cellular radio communications network and to a network entity for a cellular radio communications network, in particular, to operate a RAN function in a core network of a 5G network that applies more efficient FEC based on whether a unicast or multicast/broadcast transmission is utilized. Furthermore, a RAN function may not transmit higher layer FEC (application), if more efficient FEC is applied.

Figure 1:
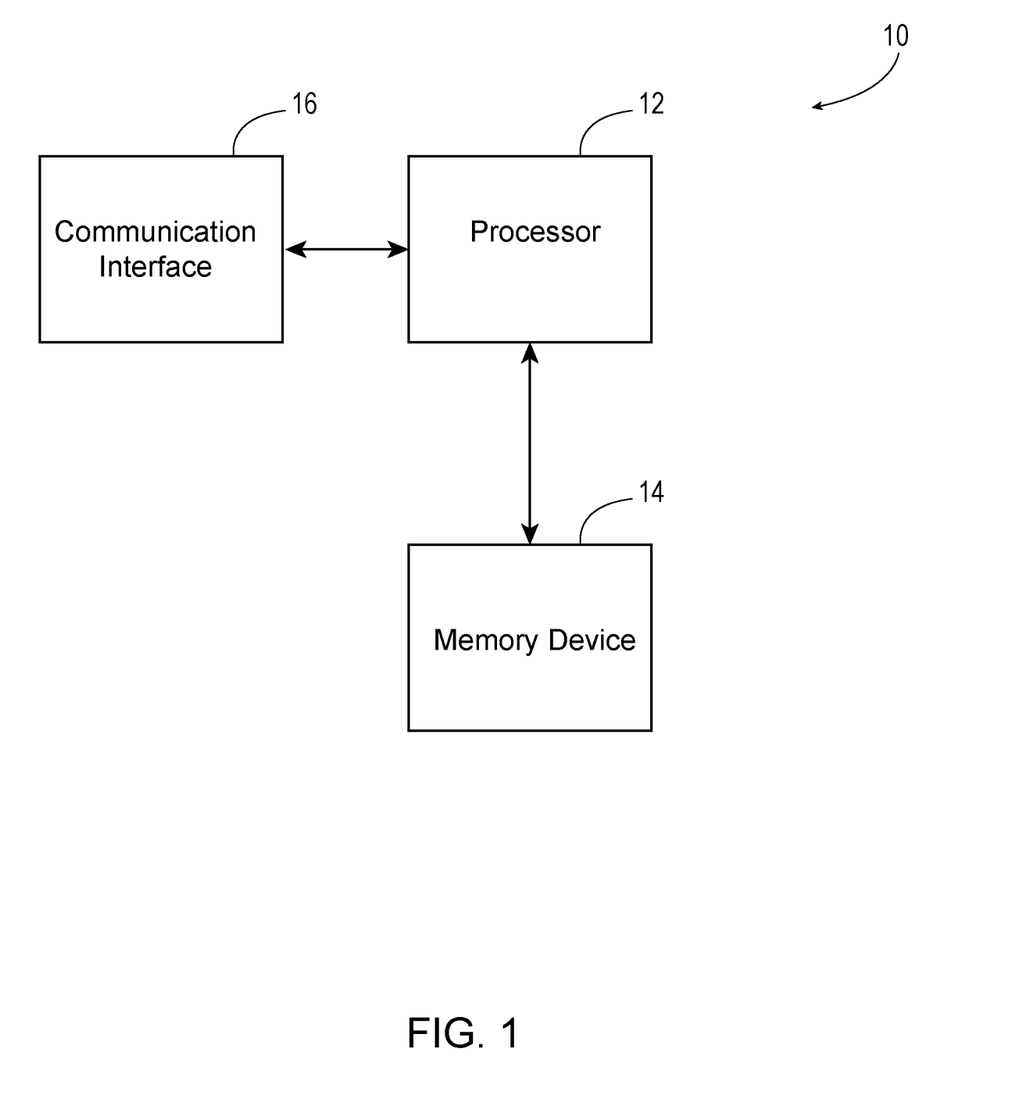
FIG. 1 is a block diagram of an apparatus that may be specifically configured in accordance with an example embodiment of the present disclosure.

In order to embody the core network including a RAN and an access and mobility management function, an apparatus 10 is provided as shown, for example, in FIG. 1. The apparatus may be embodied by any of a variety of different components such as different nodes of a 5G core network instance. As shown in FIG. 1, the apparatus of an example embodiment includes, is associated with or is otherwise in communication with a processor 12, an associated memory 14 and a communication interface 16.

The processor 12 (and/or co-processors or any other circuitry assisting or otherwise associated with the processor) may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12 may be configured to execute instructions stored in the memory device 14 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The communication interface 16 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In traditional wireless communication networks, if there is common content intended for mass delivery, it can be delivered using multicast/broadcast, since there are separate and dedicated user plane nodes and entities handling such traffic flows efficiently. 5G systems may support multicast/broadcast and unicast. The standardization efforts for fifth generation (5G) systems have already started as part of $3^{rd}$ Generation Partnership Project (3GPP) Release-14, with diverse set of requirements ranging from very high data rates up to 20 Gbps to ultra-reliable communications with air interface packet error probability down to $10^-5$ along with ultra-low-latency systems of 1 ms end-to-end latency.

In order to reach such a packet error probability, forward error correction (FEC) coding is used at various layers of protocol stack in communication systems. 4G systems support Evolved Multimedia Broadcast Multicast Services (eMBMS) which supports a multicast and broadcast along with unicast. eMBMS utilizes File Delivery over Unidirectional Transport (FLUTE) for various MBMS user services such as Progressive Download and Dynamic Adaptive Streaming over HyperText Transfer Protocol (HTTP) (3GP-DASH), file download according to 3GPP technical specification (TS) 26.346, or the like. FLUTE builds on top of asynchronous layer coding (ALC) which combines layered coding transport, congestion control and forward error correction (FEC) building blocks.

A general FEC framework supports applying FEC to arbitrary packet flows over unreliable transport and is primarily intended for real-time, or streaming, media data.

Some configurations of radio access networks (RAN) in 5G support autonomous determination to use unicast or multicast/broadcast transmission for an efficient transmission of multicast data over unicast radio bearers. A RAN may use different radio link control (RLC) entities for unicast and multicast/broadcast transmission and may use a switching function to select different RLC entities.

However, even though a RAN function may select whether to transmit multicast data using unicast or multicast/broadcast transmissions, a RAN may transmit the same data including FEC regardless of whether a unicast or multicast/broadcast is selected. Unicast and multicast/broadcast transmissions may have different configurations and transmitting the same data including FEC may be inefficient. For example, for unicast transmission, hybrid automatic repeat request (HARQ) or radio link control (RLC) retransmission may be used. These lower layer retransmissions are often more efficient compared to using higher layer FEC, and require less bits to be transmitted over the air to achieve the same result. Therefore, applying higher layer FEC in this case would be redundant and inefficient for a radio access network that is transmitting the data over-the-air using multicast rather than unicast.

Figure 2:
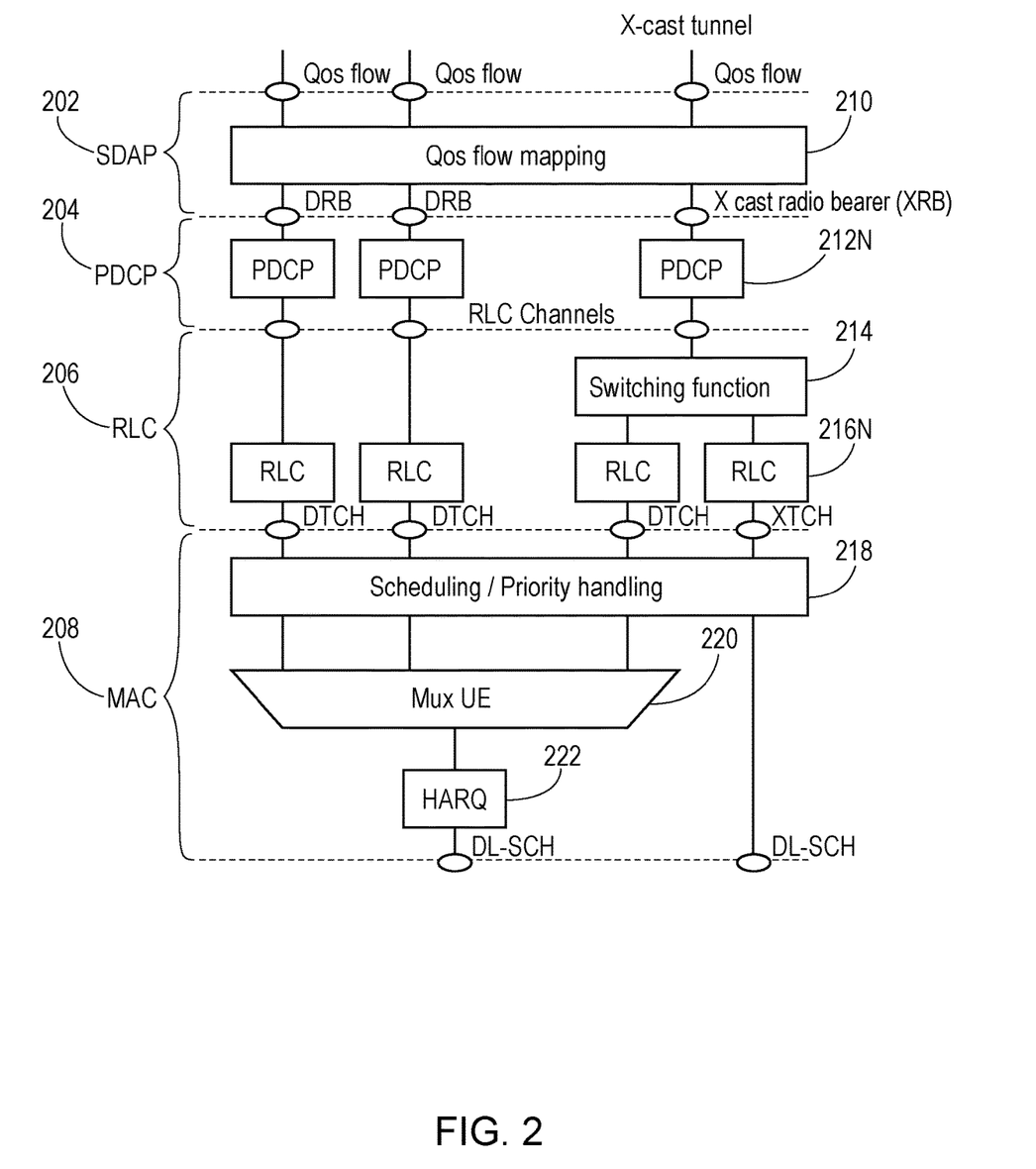
FIG. 2 illustrates an architecture of a 5G radio protocol stack.

Referring now to FIG. 2, FIG. 2 illustrates the architecture of a 5G radio protocol stack. The radio protocol stack includes Service Data Adaptation Protocol (SDAP) layer 202, Packet Data Convergence Protocol (PDCP) layer 204, Radio Link Control (RLC) layer 206, and Media Access Control (MAC) layer 208. In some embodiments, the SDAP layer 202 is responsible for mapping between a Quality of Service (QoS) flow received and a data radio bearer, such as by using the QoS flow mapping 210.

In some embodiments, the PDCP layer 204 is responsible for multiple functions related to data transmission, such as header compression and decompression, ciphering and deciphering, reordering and duplicate detection, Protocol Data Unit (PDU) routing, and the like. The PDCP layer comprises one or more PDCP entities 212N.

In some embodiments, the RLC layer 206 is responsible for transferring PDUs. The RLC layer 206 may also be responsible for error correction, concatenation, segmentation and reassembly of a RLC Service Data Unit (SDU), duplicate detection, and the like. The RLC layer includes one or more RLC entities 216N. The RLC layer further includes a switching function 214 that can select between unicast and multicast transport channels and respective different RLC entities for a QoS flow transmission.

In some embodiments, the MAC layer 208 is responsible for providing flow control and multiplexing for the transmission medium, such as by using scheduling/priority handling entity 218 and multiplexer (MUX) 220. Several RLC PDUs can be multiplexed into MAC transport blocks. The HARQ entity 222 is responsible for invoking a HARQ process for transmission with a user equipment (UE). Such a HARQ process would ensure data transmission integrity of the QoS flow.

Real-time Transport protocol (RTP) allows for retransmissions in RTP as a repair method for streaming media. Multiplexing of original and retransmission streams is achieved using session-multiplexing or synchronization source (SSRC)-multiplexing. SSRC-multiplexing is used only for unicast sessions. For multicast sessions, session-multiplexing must be used where RTP sessions for original and retransmission streams are sent on different network addresses/ports. In a FEC framework, the source and repair data may be multiplexed using RTP multiplexing. The FEC framework output are FEC source and repair packets. The FEC framework configuration information includes the definition of flows (e.g., port(s) and multicast address group(s)) for the FEC source and repair packets. The source flow may be the same as application data unit (ADU) flow (e.g., User Datagram Protocol (UDP) source and target ports and source and target addresses of the Internet Protocol (IP) datagram) as if the FEC framework is not present.

Such applications of FEC to ADU flows increase the amount of user payload a 5G network needs to transmit. FEC protects ADU flow against packet loss, which is inevitable in unidirectional communication. However, the RAN function selects whether to transmit multicast data using unicast or multicast/broadcast transmissions, the RAN function may transmit the same data including FEC regardless of whether unicast or multicast/broadcast is selected. Unicast and multicast/broadcast transmissions may have different configurations and transmitting the FEC may be inefficient. For example, for unicast transmission, hybrid automatic repeat request (HARQ) or radio link control (RLC) retransmission may be used. These lower layer retransmissions are often more efficient compared to using higher layer FEC, and require fewer bits to be transmitted over the air to achieve the same result. Therefore, applying higher layer FEC in this case would be redundant and inefficient.

In some conventional implementations, even though RAN can select unicast or multicast/broadcast transmission for multicast QoS flows, the RAN does not have information regarding whether a QoS flow is used for source or FEC repair flow. Therefore, the FEC repair flow will be transmitted over unicast when transmission of a source flow only with lower layer retransmissions is more efficient because data packet integrity may be achieved via more efficient means, such as a HARQ retransmission.

Figure 3:
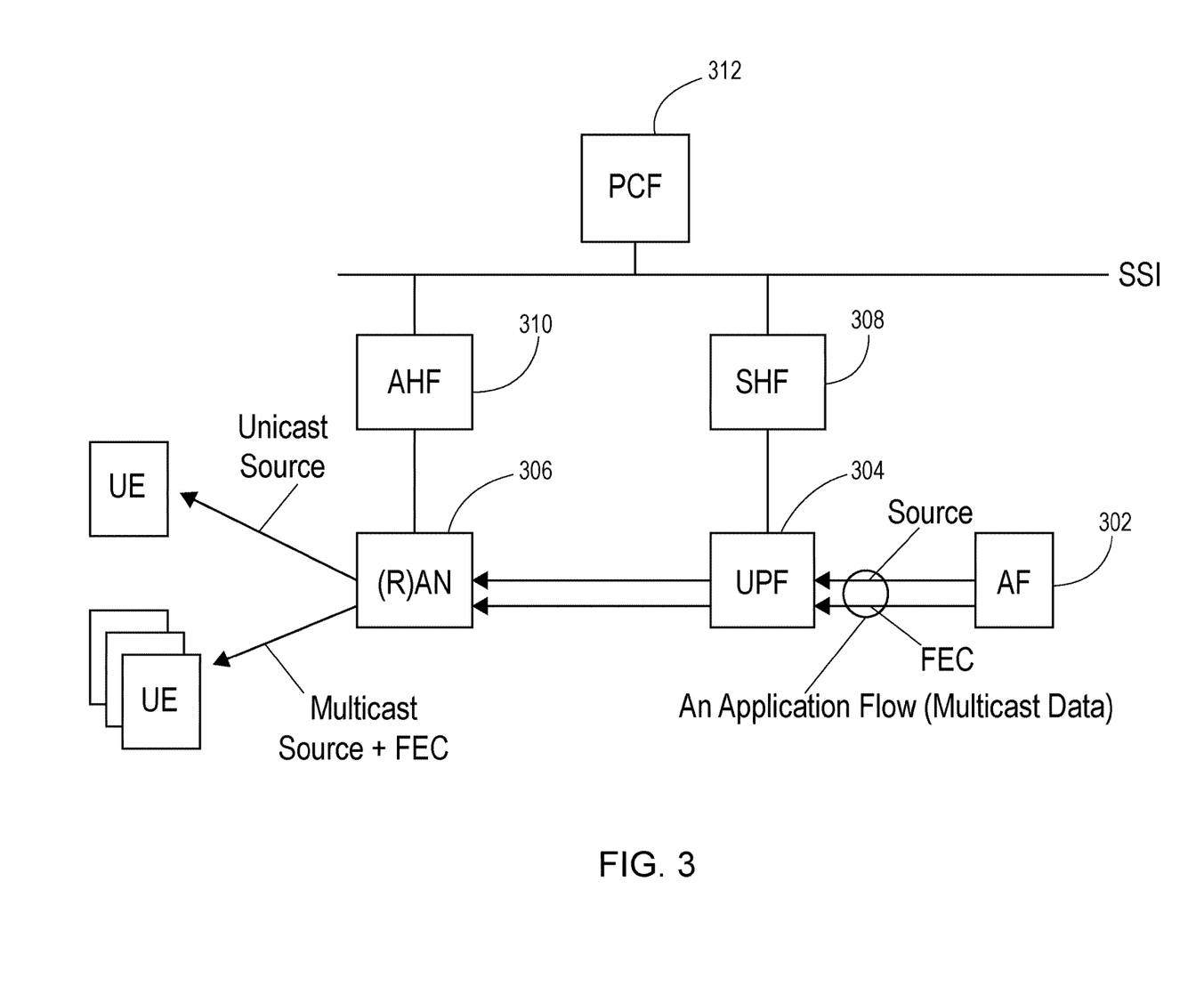
FIG. 3 illustrates a dataflow framework of a 5G system in accordance with an example embodiment of the present disclosure.

FIG. 3 illustrates a dataflow framework of a 5G system in accordance with an example embodiment of the present disclosure. As illustrated in FIG. 3, the dataflow framework includes an Application Function (AF) 302, a User Plane Function (UPF) 304, a RAN 306, a Session Management Function (SMF) 308, an Access and Mobility Management Function (AMF) 310, and a policy control function (PCF) 312.

In some embodiments, the PDU session modification would be completed for the purpose of creating a multicast context in the network. An N3 tunnel between the RAN and the UPF is established for the transport of multicast data (e.g., for IP multicast group). The RAN 306 can store associations between the multicast context and all PDU sessions for which Internet Group Management Protocol (IGMP)/multicast listener report (MLR) or other similar mechanisms triggered the PDU session modification procedure to create the association with the multicast context. Thus, the RAN using the multicast context determines a set of UEs to which the RAN may transmit the multicast data.

In some embodiments, the AF 302 invokes an Npcf_PolicyAuthorization_Create request to create an application session context at the PCF 312. As part of the request, the AF 302 may specify the MediaComponent and MediaSubComponents. The MediaSubComponent may be modified to include an optional attribute indicating whether the MediaSubComponent is for a source flow or an FEC flow. The MediaSubComponent includes the fNum attribute, which is an ordinary number of IP flow. The fNum attribute may be used to refer from a MediaSubComponent carrying the FEC flow to the MediaSubComponent carrying the source flow. The MediaSumComponent may include an attribute (e.g., fNumSource) and the value of this attribute would be fNum of MediaSubComponent carrying the source flow.

In some embodiments, if the AF invokes an Npcf_PolicyAuthorization_Create request at the time when the SMF allocated resources for a multicast session and if the PCF decides that a modification is needed, then the PCF 312 invokes an Npcf_SMPolicyControl_UpdateNotify request. The PCF 312 provides the SMF 308 with a policy and charging control (PCC) rule (PccRule) for one or more source flows and a PCC rule for one or more FEC flows for the source flows. In some embodiments, the PCC rule for FEC flows includes a reference to the PCC rule for the source flows.

In some embodiments, the SMF 308 decides on QoS flow mapping. The PCC rules for source flows may be mapped to one QoS flow, that is, all source flows are aggregated, if the flows have some QoS characteristics. Similarly, the PCC rules for FEC flows may be mapped to one QoS flow. The SMF may also map one PCC rule to one QoS flow. In some embodiments, the maximum number of flows per PDU session is currently 64.

In some embodiments, the SMF 308 may transmit an SMF message using one of the three following options: N1N2MessageTransfer, NonUeN2MessageTransfer, or a McastContextMessageTransfer.

The N1N2MessageTransfer service operation is used by a network function (NF) Service Consumer to transfer N1 and/or N2 information to the UE and/or 5G-AN through the AMF. The SMF may initiate the procedure for all impacted PDU sessions. The SMF initiates Namf_N1N2MessageTransfer as per the PDU Session Modification procedure specified in 3GPP TS 23.502. The AMF may initiate the PDU Session Resource Modify procedure of NGAP (next generation application protocol) over the N2 interface by sending a PDU SESSION RESOURCE MODIFY REQUEST containing the PDU Session Resource Setup Request Transfer IE in which the list of QoS flows for a PDU session is provided. A list of QoS flows for multicast which is new compared to a conventional implementation is included in the message. Each entry in the list represents the QoS flows for FEC flows and can include a reference (QoS Flow Id) to the corresponding QoS flow for source flows.

In some embodiments, the NonUeN2MessageTransfer is used by a NF Service Consumer to transfer N2 information to the 5G-AN through the AMF for obtaining non-UE associated network assistance data per 3GPP TS 23.502 or Warning Request Transfer procedures per 3GPP TS 23.041. The NonUeN2MessageTransfer uses Tracking Area Identities (TAI)s, NR (New Radio) Cell Global Identifiers (NCGI) s, and global RAN node IDs for routing N2 messages to the RAN nodes. The SMF 308 would need to obtain the TAIs, NCGIs or global RAN node IDs serving UEs that would receive the multicast. Accordingly, in some embodiments, the N2 message may include a multicast context ID and QoS flows configuration as discussed above for the N1N2MessageTransfer case.

In some embodiments, new resource in the AMF application program interface (API) definition for multicast contexts (e.g., /multicast-contexts) may also be introduced. In some embodiments, the SMF 308 initiates a multicast context modification procedure (e.g., an McastContextMessageTransfer request by HTTP POST to /multicast-contexts/multicastContextId}). In some embodiments, the multicast context ID may be an IP multicast group defined by an IP multicast address for any source multicast or by IP multicast address and source multicast addresses for a source specific multicast. The multicast context ID may be a temporary ID allocated for a multicast group. The AMF 310 forwards the N2 message, which would include the multicast context ID and the list of QoS flows, to RAN node(s) 306 serving the multicast context.

In some embodiments, upon the reception of the information about QoS flows carrying application source flows and corresponding FEC flows, the RAN 306 can decide to not transmit the QoS flow carrying application FEC flows when the (R)AN decides to transmit data to the UE using unicast bearers that use HARQ or RLC retransmissions.

Figure 4:
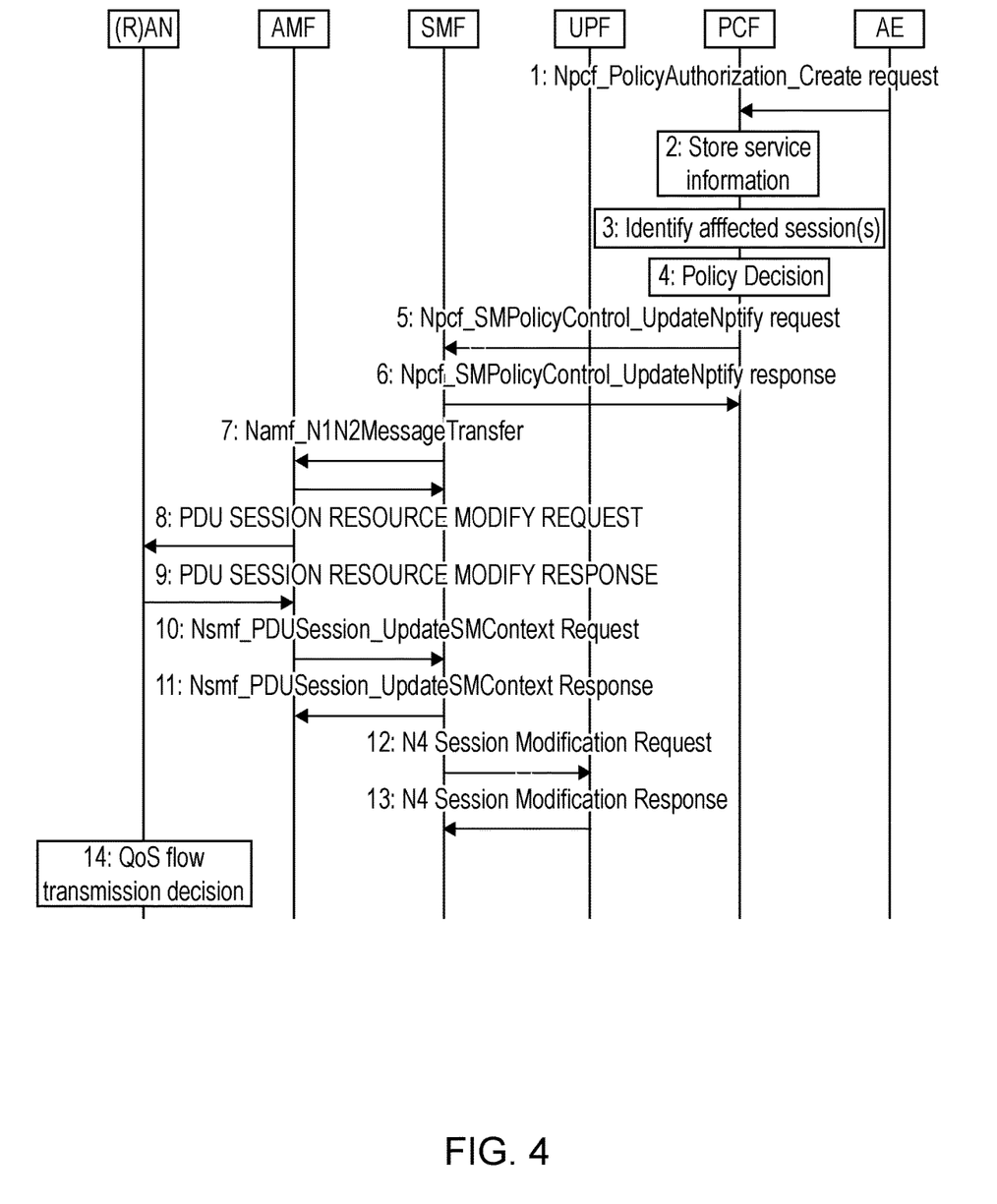
FIG. 4 is an information flow diagram illustration for provisioning of information between the entities in FIG. 3 in accordance with an example embodiment of the present disclosure.

FIG. 4 is an information flow diagram illustration of the above-mentioned provisioning of information between the entities described in conjunction with FIG. 3 in accordance with an example embodiment of the present disclosure. In operation 14 of FIG. 4, the multicast data is delivered to NG-RAN over a data tunnel. In some embodiments, the decision to transmit the QoS flow carrying application FEC flows or not is done above the RLC layer, e.g., in the protocol entity where the dynamic selection is made between unicast and multicast RLC entities and transport channels for the transmission. Consequently, in some embodiments, in the case of the central unit (CU)/distributed unit (DU) split architecture with F1 front haul interface, the decision functionality may be included in the DU and carry the decision to not to transmit FEC flow for unicast. At least the QoS flow payload type, the one or more sets of QoS parameters and the relation between QoS flows are provided over the F1 interface to the DU.

In some embodiments, if a network node (e.g., DU) is responsible for and decides to deliver multicast data over unicast to all UEs interested in the reception of the multicast data using only QoS flows carrying application source flows, then the network node may notify an upstream network node (e.g. CU) about the decision. The notification may include identities of QoS flows carrying application source flows. Upon receiving such notification, the upstream network node may decide not to transmit QoS flows carrying FEC flows. When the network node later decides to transmit multicast data using a multicast/broadcast transmission and the upstream network node suspended transmission of FEC flows, the network node may request the upstream node to transmit QoS flows carrying FEC flows.

Figure 5A:
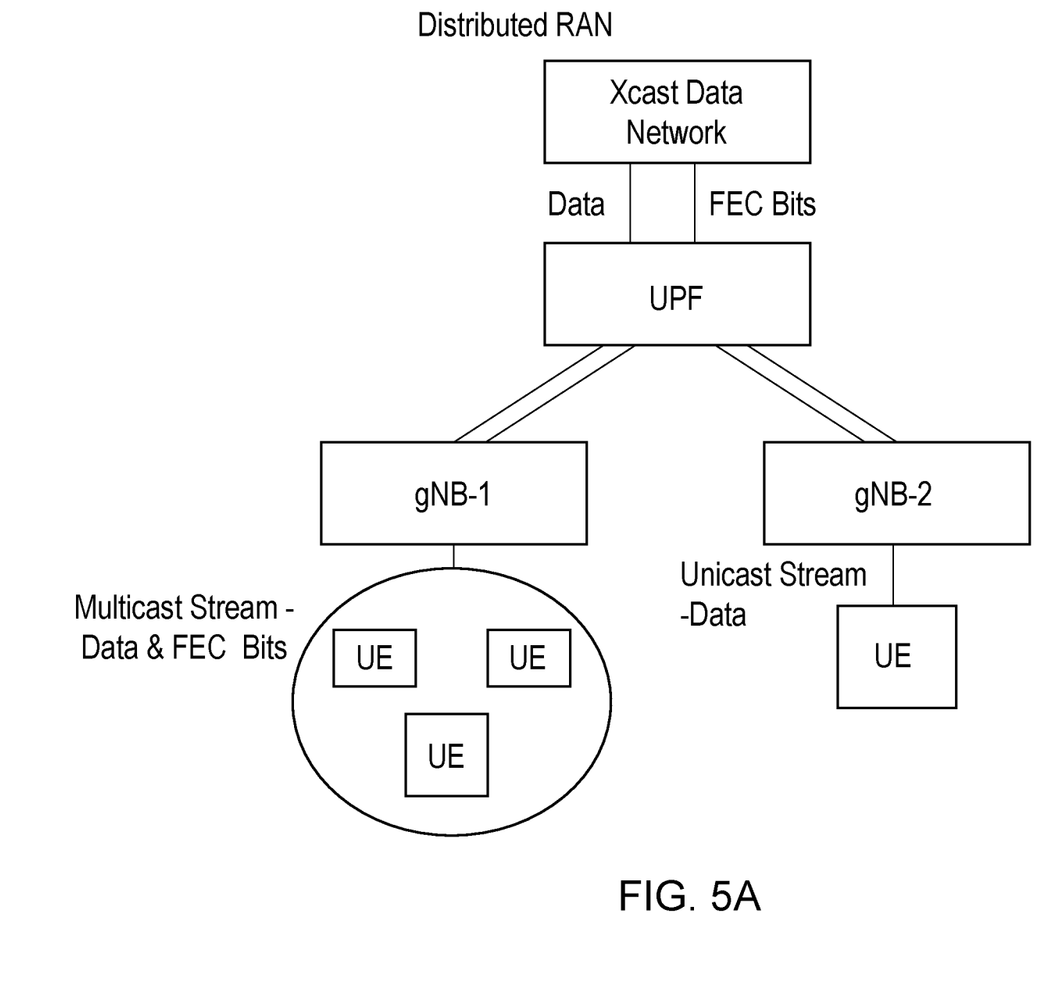
FIGS. 5A and 5B illustrate delivery of data stream in a distributed RAN and a centralized RAN in accordance with an example embodiment of the present disclosure.
Figure 5B:
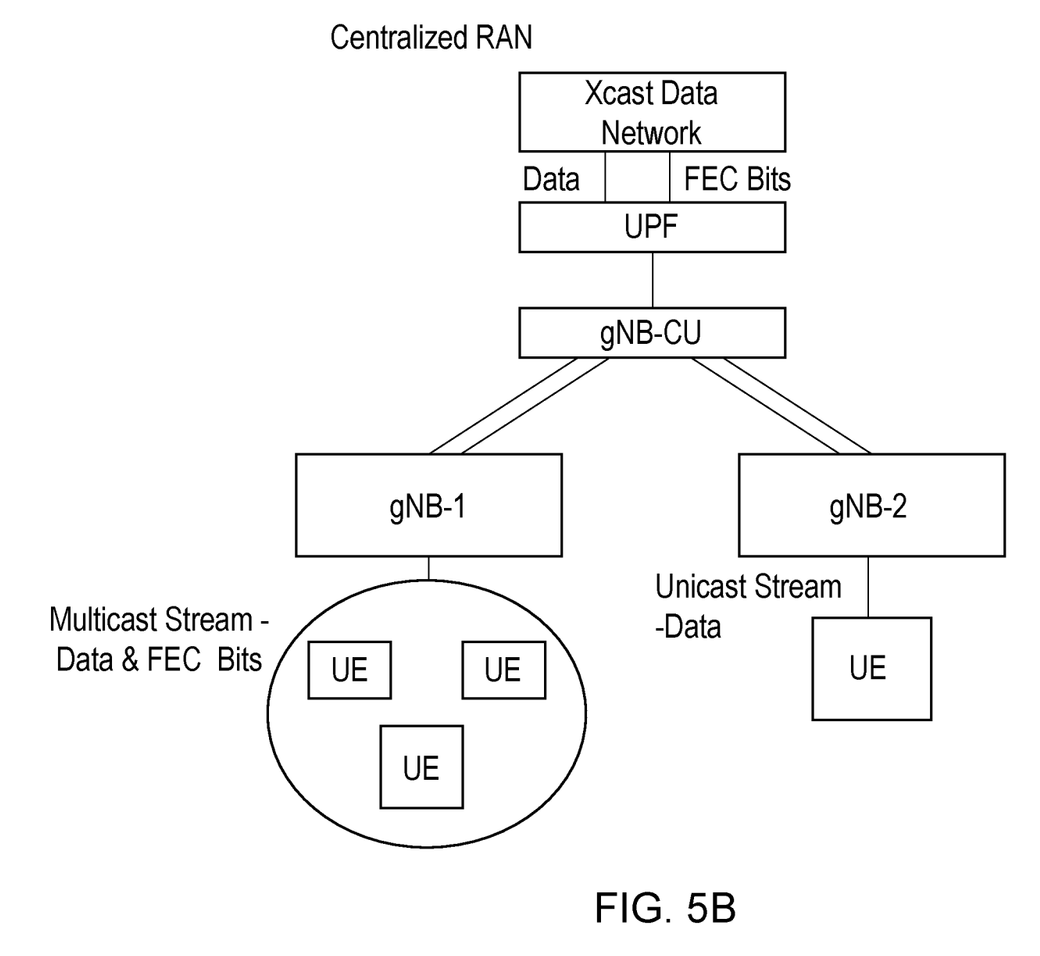

FIGS. 5A and 5B illustrate delivery of a data stream in a distributed RAN and a centralized RAN in accordance with an example embodiment of the present disclosure. With a distributed RAN illustrated in FIG. 5A, the Next generation NodeB (gNB) has the capability to decide the over-the-air transmission mode. The gNB-DU would have the capability to decide the over-the-air transmission mode in the centralized RAN scenario illustrated in FIG. 5B. The gNB-DU would also transmit FEC flows only in case a multicast mode is used. For the unicast scenario, this saves a significant amount of radio resources, while providing higher flexibility to the RAN.

Figure 6A:
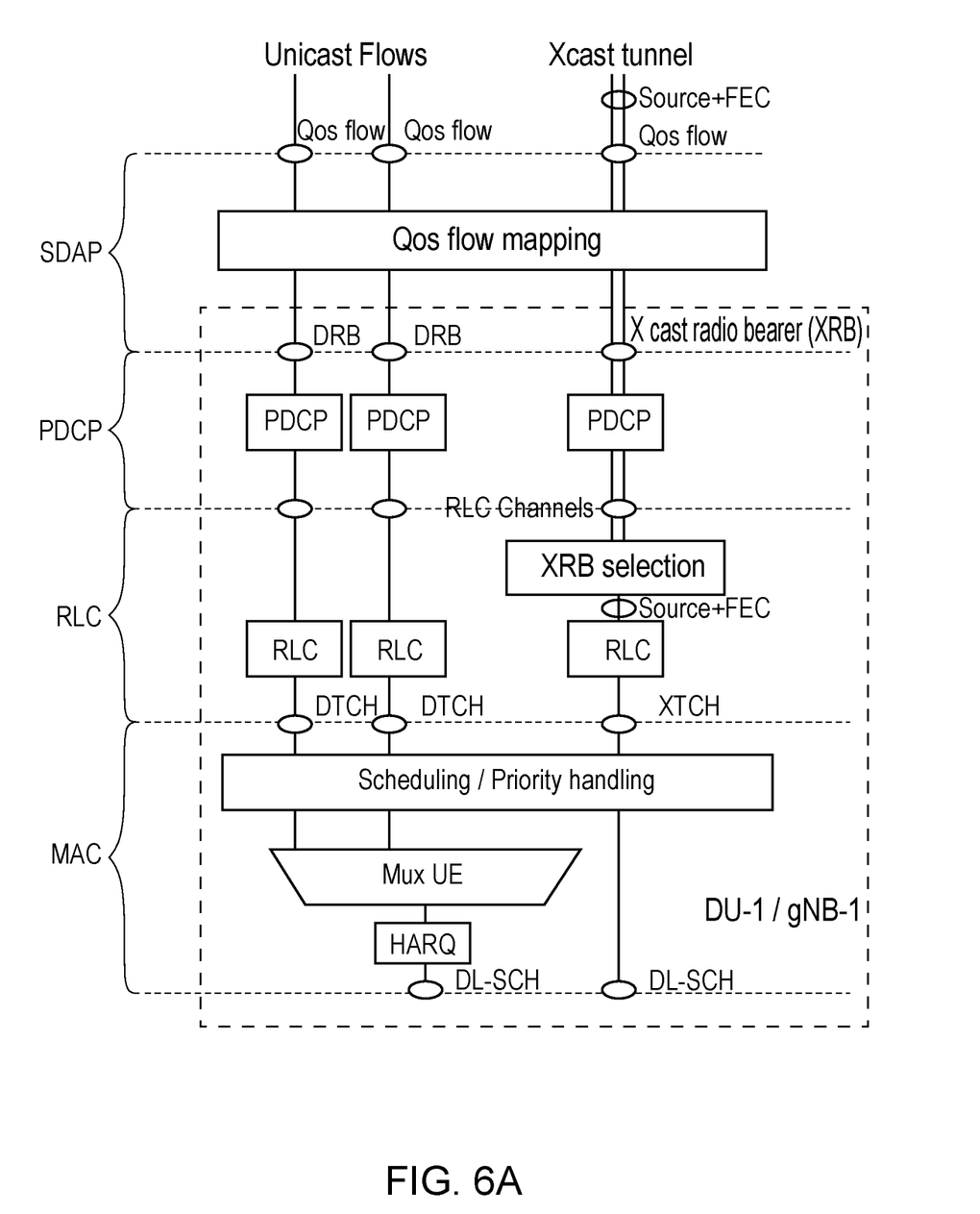
FIGS. 6A and 6B illustrate an updated architecture of a 5G radio protocol stack in accordance with an example embodiment of the present disclosure.
Figure 6B:
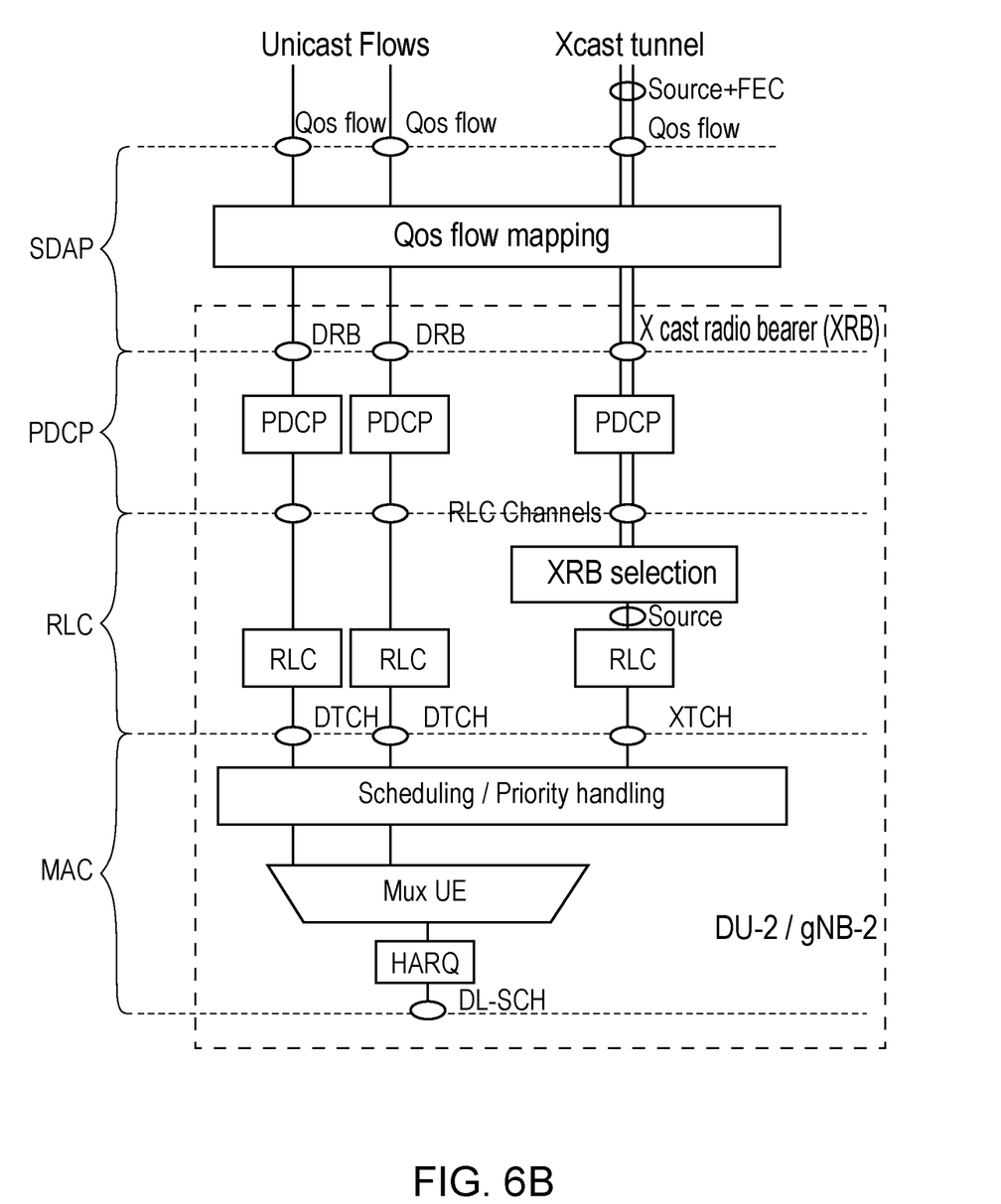

FIGS. 6A and 6B illustrate an updated architecture of a 5G radio protocol stack in accordance with an example embodiment of the present disclosure. In some embodiments, the DU-1/gNB-1 will schedule the source and FEC flows using Xcast radio bearers with multicast transmissions over-the-air. DU-2/gNB-2 will be able to drop the FEC flow and schedule only the source flow using unicast transmissions over-the-air. Such flows may be multiplexed with other existing unicast flows within the gNB/DU.

Such an implementation enables more optimal transmission of multicast data by RAN because application layer FEC is not transmitted over unicast bearers but more efficient lower layer techniques (e.g., HARQ and/or RLC retransmissions, link adaptation). In addition, the QoS flow for application source flow may have more than one QoS profiles (e.g., one QoS profile for multicast when FEC is also transmitted and one QoS profile for unicast when no application layer FEC is used because no FEC data are transmitted (the layer implementing the application layer FEC perceives the system as all FEC data are lost in the network).

Turning now to FIG. 7, the operations performed by the RAN 306 which may be embodied by the apparatus illustrated in FIG. 1 in accordance with an example embodiment are illustrated. As shown in block 700, the RAN 306 includes means, such as the communication interface 16 and/or the processing circuitry 12, for receiving an application flow comprising a source flow and a supplementary flow from a core network. In some embodiments, the application flow may comprise QoS source flows and repair flows, described in conjunction with FIG. 3. As previously described in conjunction with FIG. 3, the application flow may be received from the UPF 304 in FIG. 3. In some embodiments, there may be more than one supplementary flow which may all be included in a QoS flow list described in conjunction with FIG. 3. The operations 704 to 708 may be performed for each of the supplementary flows.

As shown in block 702, the RAN 306 includes means, such as the communication interface 16 and/or the processing circuitry 12, for receiving a flow payload indication from the core network. In some embodiments, the flow payload indication may take the form of the N2 message described in conjunction with FIG. 3. As previously described in conjunction with FIG. 3, the flow payload indication may be received from the AMF 310 in FIG. 3, for example, originated from the SMF and transferred to the RAN 306 via the AMF. The SMF may determine what payload indication to use based on various information sources, for example. a reference between policy and charging control rules for a source flow and a supplementary flow, received from the PCF.

As shown in block 704, the RAN 306 includes means, such as the processing circuitry 12, for determining whether the application flow is to be transmitted via a unicast transmission or a multicast transmission.

As shown in block 706, the RAN 306 includes means, such as the processing circuitry 12, for determining whether the supplementary flow is droppable based on the flow payload indication. In some embodiments, the RAN 306 determines whether the supplementary flow is droppable based on the flow payload indication by parsing an indication of whether the supplementary flow is a repair flow, or the like, from the flow payload indication. In addition, the RAN 306 determines whether the supplementary flow is droppable based by determining whether the application flow is to be transmitted via a unicast transmission or a multicast transmission. For example, in some embodiments, if the supplementary flow is a repair flow and if the application flow is to be transmitted via a unicast transmission, the RAN 306 would determine that the supplementary flow is droppable. Certain examples of such embodiments utilize lower layer error correction mechanisms, such as HARQ, RLC, or other retransmission mechanisms, for the unicast transmission.

In some embodiments, if the supplementary flow is a repair flow and if the application flow is to be transmitted via a multicast transmission where lower layer error correction mechanisms, such as HARQ, RLC, or other retransmission mechanisms may be utilized by the multicast transmission, the RAN 306 would determine that the supplementary flow is droppable.

As shown in block 708, the stream registry 204 includes means, such as the communication interface 16 and/or the processing circuitry 12, for transmitting only the source flow in a circumstance where the supplementary flow is droppable.

As described above, FIG. 7 is a flowchart of an apparatus 10, method, and computer program product according to certain example embodiments. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart of FIG. 7. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as represented by the blocks outlined in dashed lines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    receiving an application flow comprising a source flow and a supplementary flow from a core network;
    receiving a flow payload indication from the core network;
    determining whether the application flow is to be transmitted via a unicast transmission or a multicast transmission;
    determining whether the supplementary flow is droppable based on the flow payload indication and whether the application flow is to be transmitted via a unicast transmission or a multicast transmission; and
    in a circumstance where the supplementary flow is droppable, causing only the source flow to be transmitted.

2. A method according to claim 1 wherein the application flow is received from a user plane function (UPF) in the core network.

3. A method according to claim 1 wherein determining whether the supplementary flow is droppable comprises parsing an indication of whether the supplementary flow is a repair flow from the flow payload indication.

4. A method according to claim 1 wherein the supplementary flow is droppable if the supplementary flow is a forward error correction repair flow and if the application flow is to be transmitted via a unicast transmission.

5. A method according to claim 1 wherein the unicast transmission utilizes hybrid automatic repeat request (HARQ) retransmission or radio link control (RLC) retransmission.

6. A method according to claim 1 wherein the supplementary flow is droppable in an instance in which the supplementary flow is a repair flow and the application flow is to be transmitted via a multicast transmission with a lower level error correction mechanism utilized by the multicast transmission.

7. A method according to claim 1 wherein the flow payload indication comprises one or more policy and charging control (PCC) rules provided by a policy control function.

8. An apparatus comprising at least one processor and at least one memory including computer program code for one or more programs, the at least one memory and the computer program code configured to, with the at least one processor, cause the apparatus at least to:
    receive an application flow comprising a source flow and a supplementary flow from a core network;
    receive a flow payload indication from the core network;
    determine whether the application flow is to be transmitted via a unicast transmission or a multicast transmission;
    determine whether the supplementary flow is droppable based on the flow payload indication and whether the application flow is to be transmitted via a unicast transmission or a multicast transmission; and
    in a circumstance where the supplementary flow is droppable, cause only the source flow to be transmitted.

9. An apparatus according to claim 8 wherein the application flow is received from a user plane function (UPF) in the core network.

10. An apparatus according to claim 8 wherein the at least one memory and the computer program code are configured to, with the at least one processor, cause the apparatus to determine whether the supplementary flow is droppable by parsing an indication of whether the supplementary flow is a repair flow from the flow payload indication.

11. An apparatus according to claim 8 wherein the supplementary flow is droppable if the supplementary flow is a forward error correction repair flow and if the application flow is to be transmitted via a unicast transmission.

12. An apparatus according to claim 11 wherein the unicast transmission utilizes hybrid automatic repeat request (HARQ) retransmission or radio link control (RLC) retransmission.

13. An apparatus according to claim 8 wherein the supplementary flow is droppable in an instance in which the supplementary flow is a repair flow and the application flow is to be transmitted via a multicast transmission with a lower level error correction mechanism utilized by the multicast transmission.

14. An apparatus according to claim 8 wherein the flow payload indication comprises one or more policy and charging control (PCC) rules provided by a policy control function.

15. A computer program product comprises at least one non-transitory computer-readable storage medium having computer executable program code instructions stored therein, the computer executable program code instructions comprising program code instructions configured, upon execution, to:
   receive an application flow comprising a source flow and a supplementary flow from a core network;
   receive a flow payload indication from the core network;
   determine whether the application flow is to be transmitted via a unicast transmission or a multicast transmission;
   determine whether the supplementary flow is droppable based on the flow payload indication and whether the application flow is to be transmitted via a unicast transmission or a multicast transmission; and
   in a circumstance where the supplementary flow is droppable, cause only the source flow to be transmitted.

16. A computer program product according to claim 15 wherein the application flow is received from a user plane function (UPF) in the core network.

17. A computer program product according to claim 15 wherein the supplementary flow is droppable if the supplementary flow is a forward error correction repair flow.

18. A computer program product according to claim 15 wherein the supplementary flow is droppable if the supplementary flow is a forward error correction repair flow and if the application flow is to be transmitted via a unicast transmission.

19. A computer program product according to claim 18 wherein the unicast transmission utilizes hybrid automatic repeat request (HARQ) retransmission or radio link control (RLC) retransmission.

20. A computer program product according to claim 15 wherein the flow payload indication comprises one or more policy and charging control (PCC) rules provided by a policy control function.

* * * * *